US006621184B1

United States Patent
Smoliar et al.

(10) Patent No.: US 6,621,184 B1
(45) Date of Patent: Sep. 16, 2003

(54) SUBSTRATE BASED PENDULUM MOTOR

(75) Inventors: Laura A. Smoliar, Los Altos, CA (US); Gabriel Risk, San Francisco, CA (US); Doug Webb, Los Altos, CA (US); Jim Hunter, Campbell, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 09/949,453

(22) Filed: Sep. 7, 2001

(51) Int. Cl.[7] .............................................. H01L 21/301
(52) U.S. Cl. ................................ 310/40 MM; 430/319; 438/104
(58) Field of Search ................... 310/40 MM; 318/558; 438/10, 104, 400; 430/311, 318, 319

(56) References Cited

U.S. PATENT DOCUMENTS

| 5,366,587 A | * 11/1994 | Ueda et al. .................. 156/651 |
| 5,510,299 A | * 4/1996 | Li et al. ....................... 437/225 |
| 5,600,190 A | * 2/1997 | Zettler .................. 310/40 MM |
| 5,705,318 A | * 1/1998 | Mehregany et al. ........ 430/312 |

* cited by examiner

Primary Examiner—Bentsu Ro
(74) Attorney, Agent, or Firm—Wagner, Murabito & Hao LLP

(57) ABSTRACT

A pendulum motor having a stator and a cantilever beam moveable by an electrostatic force to predetermined positions relative to a supporting structure. A micro electro mechanical system (MEMS) mechanism is formed on a semiconductor substrate using process steps that are completely compatible with current CMOS technology. A cantilever beam is fixed at one end to a structural layer and an electrode arrangement that provides an electrostatic field across a gap between the beam and a stator. A force between the beam and the stator generated by the electrostatic field results in movement of the free end of the beam relative to the stator. The free end of the beam may then be displaced by a predetermined amount from an equilibrium position and held in place by means of an applied electrostatic field. Movement of the free end of the beam is in a plane parallel to the surface of the support structure and it may follow either a circular or a non-circular path. The beam may be used as a waveguide to form a 1×N switch, the signal entering the fixed end of the beam and exiting the free end of the beam at one of N receptors depending upon beam displacement. In a second embodiment, a 1×N switch is formed using attached fiber optics. In a third embodiment, two pendulum motors configured fixed end to fixed end are used to form a one channel M×N switch.

21 Claims, 12 Drawing Sheets

200

500

SUBSTRATE BASED PENDULUM MOTOR

BACKGROUND OF THE INVENTION

1. Field of the Invention

The present invention relates to the field of micro electro mechanical systems (MEMS). More particularly, the present invention relates to an electrostatic microactuator referred to as a pendulum motor that is fabricated using surface micromachining techniques.

2. Related Art

Microelectro Mechanical Systems (MEMS) technology has developed rapidly over the past decade due in part to an increased interest in communications systems. MEMS technology used in the fabrication of microstructures includes both bulk and surface micromachining techniques. Bulk micromachining refers to etching the surface of a silicon wafer, while surface micromachining refers to selective etching of mulitlayer thin films on the surface of a silicon wafer.

Microactuators have been developed for use as switches in optical switching applications using current MEMS technology. Electostatically activated microactuators are inherently fast and have low power consumption. In addition, such switches have low insertion loss, reduced crosstalk, and are both wavelength and polarization independent. Furthermore, the size and weight of such optomechanical switches are considerably smaller than previously used optomechanical switches. Batch fabrication reduces cost and provides the means for monolithic integration of large switch matrices on a single semiconductor chip.

A number of electostatically activated microactuators useful as optical switches are currently fabricated on the surface of a silicon wafer using both bulk and surface micromachining techniques. However, some of the materials and processes used in the fabrication of existing microactuators are incompatible with current CMOS technology. Furthermore, the movable portions of these actuators generally exhibit only small displacements, and are capable of movement only in a direction perpendicular to the surface plane of the silicon wafer.

Greater displacement of a moveable member in an electrostatically activated device requires a corresponding increase in the magnitude of an actuating voltage. Higher voltages are of course limited by the breakdown voltage of air or the gas in which the actuator operates. Strict mechanical accuracies during fabrication are also required to produce very smooth surfaces between parts of an electrostatically activated actuator. Otherwise, asperities on electrode surfaces may induce localized electric field emissions or corona discharge at low electric field levels thus further limiting the upper value of applied actuator voltage.

SUMMARY OF THE INVENTION

Accordingly, what is needed is a MEMS device that can be fabricated using current CMOS fabrication techniques. What is needed further is a MEMS device that can be fabricated using CMOS technology and can also be used in the field of optical switching. These and other advantages of the present invention not described above are explained in discussions to follow.

Embodiments of the present invention provide a micro electro mechanical system (MEMS) fabricated on a semiconductor wafer using process steps that are compatible with current CMOS technology. The mechanism formed is a pendulum motor having a stator and a moveable cantilever beam. Both the stator and the cantilever beam with one end coupled to a structural layer are formed by etching one or more sacrificial layers deposited on the surface of a structural layer.

A novel step in the fabrication process separates a portion of the cantilever beam from the structural layer by utilizing xenon di-flouride for gas-phase selective etching of a sacrificial layer between the structural layer and the beam. Both the beam and the structure coupling of the beam to the structural layer are flexible, and the uncoupled end of the beam is therefore displaceable from an equilibrium position. A series of electrodes placed on the stator and the beam may be used to create an electrostatic field across a gap separating the beam from the stator. The electrodes are arranged such that the beam may be displaced and held in one or more predetermined positions by the application of a suitable electrostatic field.

Movement of the free end of the beam is in a plane parallel to the surface of the structural layer and may trace either a circular or a non-circular path. Using the beam as a waveguide or as a support for optical fiber, a signal entering at the fixed end of the beam may then be directed to any one of numerous signal receptors positioned along the path of the free end of the beam. It is to be appreciated that optical mirrors may be placed on the surface of the cantilever beam to form an optical switching mechanism.

In one embodiment, what is described is a pendulum motor having a stator and a cantilever beam moveable by an electrostatic force to predetermined positions relative to a supporting structure. A micro electro mechanical mechanism is formed on a semiconductor substrate using process steps that are completely compatible with current CMOS technology. The mechanism consists of a cantilever beam fixed at one end to a structural layer and an electrode arrangement that provides an electrostatic field across a gap between the beam and a stator. A force between the beam and the stator generated by the electrostatic field results in movement of the free end of the beam relative to the stator.

The free end of the beam may then be displaced by a predetermined amount from an equilibrium position and held in place by means of an applied electrostatic field. Movement of the free end of the beam is in a plane parallel to the surface of the support structure and it may follow either a circular or a non-circular path. In one embodiment, the beam is used as a waveguide to form a 1×N switch, the signal entering the fixed end of the beam and exiting the free end of the beam at one of N receptors depending upon beam displacement. In a second embodiment, a 1×N switch is formed using attached fiber optics. In a third embodiment, two pendulum motors configured fixed end to fixed end are used to form a one channel blocking M×N switch.

More specifically, a first embodiment of the present invention includes releasing portions of a member from a structural layer by etching a sacrificial layer between the member and the structural layer. The released portions of the member may be in the form of a cantilever beam which is moveable with respect to the structural layer. The beam itself may be solid or hollow, and remains attached to the structural layer at a single position by means of a post structure between the beam and the structural layer. In this first embodiment, the unattached end of the beam is in the form of a segment of a disk positioned parallel to the surface of the structural layer and located such that the centerline along the length of the beam bisects the segment and passes through the center point of the disk. Movement of the hammer head shaped end of the beam about the attachment post follows a circular path parallel to the structural layer. An electrostatic field across a gap between one or more electrodes placed to form a stator on the structural layer and one or more electrodes on the beam may be used to generate a force sufficient to displace and hold the unattached end of the beam in a predetermined position relative to the stator.

A second embodiment of the present invention includes releasing portions of a member from a structural layer by etching a sacrificial layer between the member and the structural layer. The released portion of the member is in the form of a cantilever beam which is moveable with respect to the structural layer. The beam itself may be solid or hollow, and one end of the beam is attached at a single position to a supporting structure which is attached to the structural layer. In this second embodiment, the unattached end of the beam is in the form of a torus placed parallel to the surface of the structural layer and located such that the centerline along the length of the beam bisects the torus and passes through the generation point of the torus. Movement of the torus shaped end of the beam about the attachment point follows a non-circular path parallel to the structural layer.

An electrostatic field across a gap between one or more electrodes placed on the stator and one or more electrodes on the beam may be used to generate a force sufficient to displace and hold the unattached end of the beam in a predetermined position relative to the structural layer. In one embodiment of the present invention, a series of electrode elements are arranged in a plane on the surface of the substrate to form a stator and a single electrode is positioned in a parallel plane on the surface of the beam. In a second embodiment, the electrode elements of the stator and the beam are arranged to form a comb type electrode arrangement. In a third embodiment, the electrode elements forming the stator and the beam may be arranged at various angles with respect to the surface of the substrate.

The process steps used in the fabrication of the present invention are compatible with current CMOS process steps. The first step includes the deposition of a structural layer on the surface of a substrate. A second structural layer is then deposited over a sacrificial layer in a pattern to form a first member and a second member that are separated by the sacrificial layer. The first member is then further developed by deposition of silicon nitride over a second sacrificial layer. A crucial and unique step in this process involves selective gas phase etching with xenon di-flouride to separate portions of the first member from the second member leaving the first member attached to the second member at a single position. The first member is in the form of a cantilever beam, the free end of which is moveable. The beam may remain solid or may be etched to form a hollow beam. A series of electrode elements are then positioned on the second member to form a stators and at least one electrode element is positioned on the beam. An electrostatic field across a gap between electrodes on the stator and one or more electrodes on the beam may be used to generate a force sufficient to displace and hold the unattached end of the beam in a predetermined position relative to the stator.

DETAILED DESCRIPTION OF THE INVENTION

In the following detailed description of the present invention, a substrate based pendulum motor, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
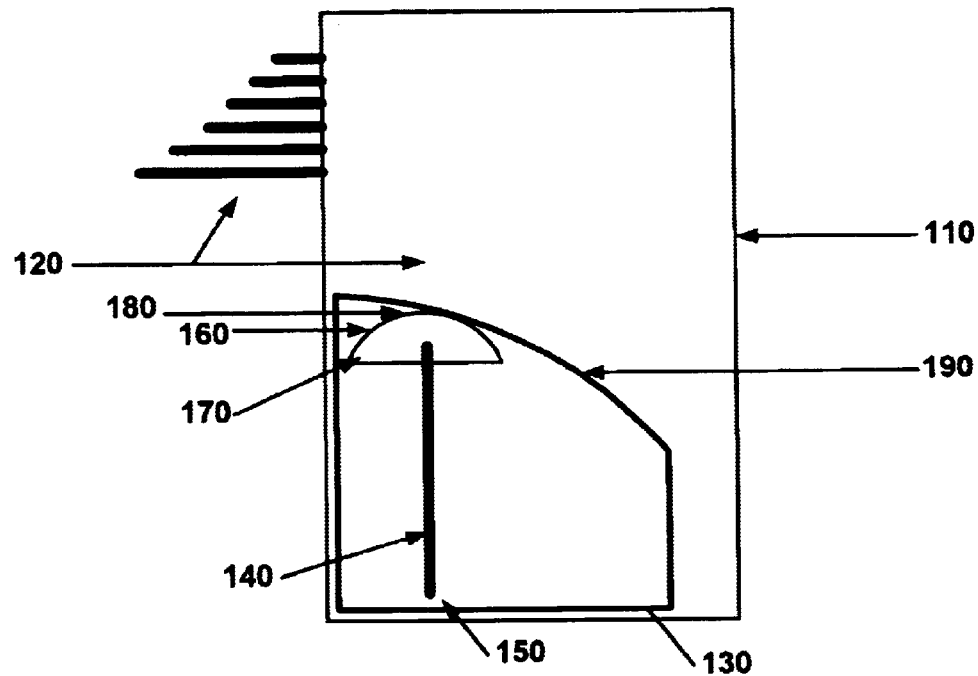
FIG. 1 is a plan view of a micro electro mechanical system (MEMS) referred to as a pendulum motor according to an embodiment of the present invention.

FIG. 1 is a plan view 100 of a micro electro mechanical system (MEMS) referred to as a pendulum motor according to an embodiment of the present invention. The pendulum motor may be fabricated by micromachining techniques, removing sacrificial layers deposited on a structural layer overlaying a substrate. The motor consists of a stator 110 upon which are deposited metal electrodes 120, and a moveable member 140. In this embodiment, the moveable member is a cantilever beam freed from the substrate by selective etching of the sacrificial layer 130. The cantilever beam is attached to the structural layer at a single position 150.

The moveable end of the cantilever beam is terminated in the form of a segment of a disk 160 positioned parallel to the surface of the structural layer and located such that the centerline along the length of the beam bisects the disk segment and passes through the center point of the disk enclosing the disk segment. A beam electrode 170 is located on the surface of the disk segment. An electric field across the gap 180 separating the stator and the beam end may be used to displace the beam along a circular path 190 and hold it in a predetermined position.

Figure 2:
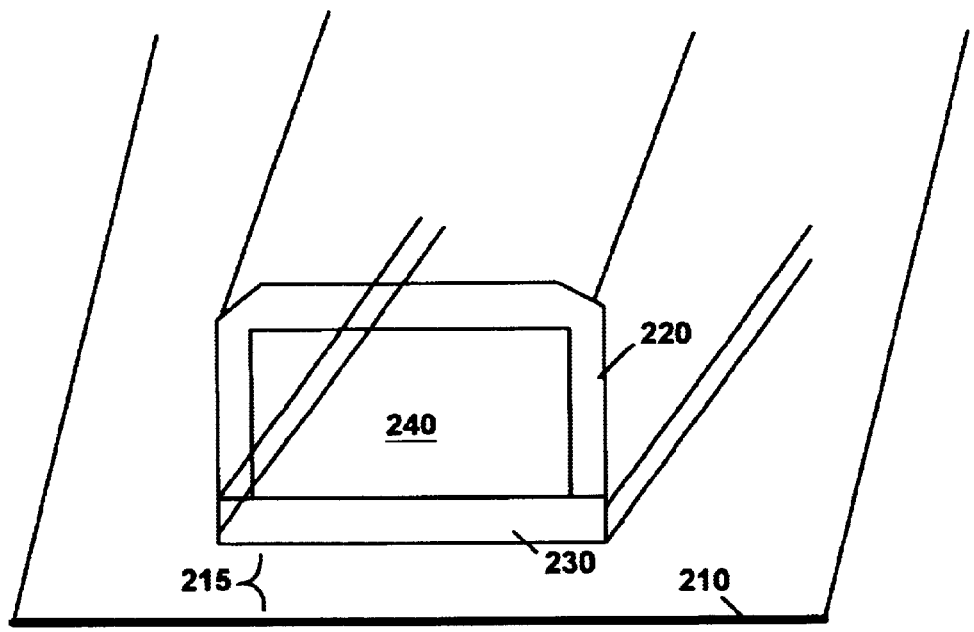
FIG. 2 is a cross-sectional view of the box beam used in the pendulum motor according to an embodiment of the present invention.

FIG. 2 is a cross-sectional view of the cantilever box beam 200 used in the pendulum motor according to an embodiment of the present invention. The beam is separated from the underlaying structural layer 210 by a space 215 created during etching of a sacrificial layer. The top and sides of the beam 220 are fabricated using silicon nitride, while the bottom of the beam 230 is fabricated using silicon dioxide. In this embodiment, the beam itself is four sided which aids in the reduction of any twisting of beam itself as it is deflected from an equilibrium position. A second embodiment eliminates the silicon dioxide bottom side of the beam to form a three sided structure. The interior of the beam 240 may be filled with polysilicon to form a solid beam, or it may be made hollow by etching.

Figure 3A:
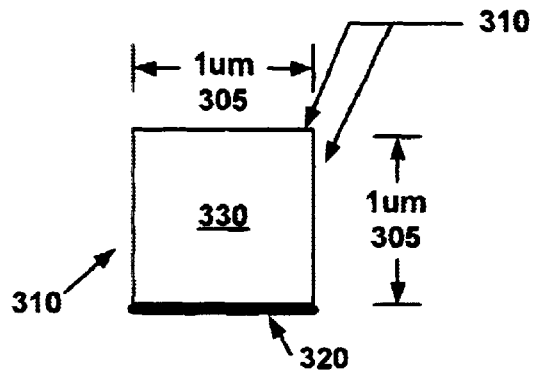
FIG. 3a is a cross-sectional view of the box beam used in the pendulum motor having the inside of the beam removed by etching according to an embodiment of the present invention.

FIG. 3a is a cross-sectional view of the box beam 300 used in the pendulum motor according to an embodiment of the present invention. In this embodiment, the beam is square having the length of each side 305 about 1 micrometer. The top and sides of the beam 310 consist of silicon nitride having a thickness of about 1000 angstroms. The bottom side of the beam 320 is silicon dioxide having a thickness of about 200 angstroms. The interior of the beam 330 is hollow.

Figure 3B:
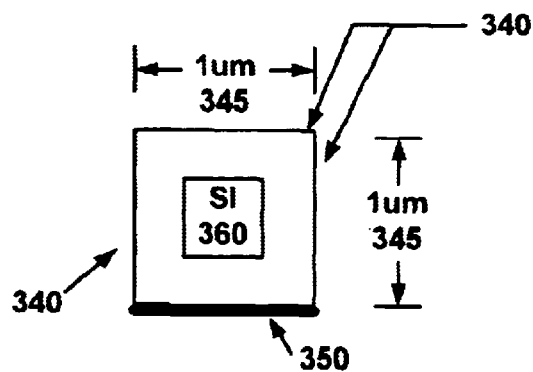
FIG. 3b is a cross-sectional view of the box beam used in the pendulum motor with the inside of the beam filled with silicon according to an embodiment of the present invention.

FIG. 3b is a cross-sectional view of the box beam 300 used in the pendulum motor according to an embodiment of the present invention. In this embodiment, the beam is square having the length of each side 345 about 1 micrometer. The top and sides of the beam 340 consist of silicon nitride having a thickness of about 1000 angstroms. The bottom side of the beam 350 is silicon dioxide having a thickness of about 200 angstroms. The beam itself is solid and the interior of the beam 360 is fabricated with polysilicon.

Figure 4:
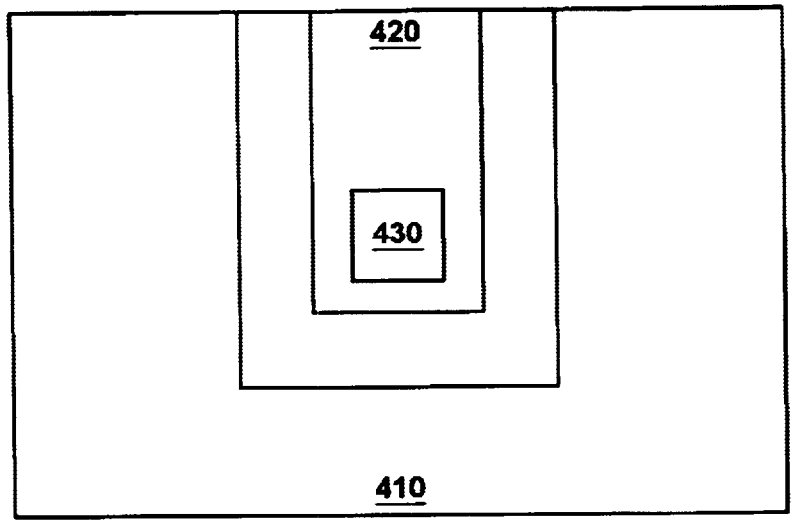
FIG. 4 is a plan view showing coupling of the beam to the structural layer by means of a post according to an embodiment of the present invention.

FIG. 4 is an expanded plan view 400 showing coupling of one end of the beam 420 to the underlaying structural layer at a single position to form a cantilever. The region in which sacrificial material was removed 410 from between the beam and the structural layer is illustrated. In this embodiment, the bottom side of the beam is coupled to the structural layer by means of a post 430. The post may be solid and fabricated from polysilicon or silicon nitride, or it may be in the form of a hollow shell. This particular coupling allows the moveable end of the beam to be displaced along a circular path centered on the post.

Figure 5:
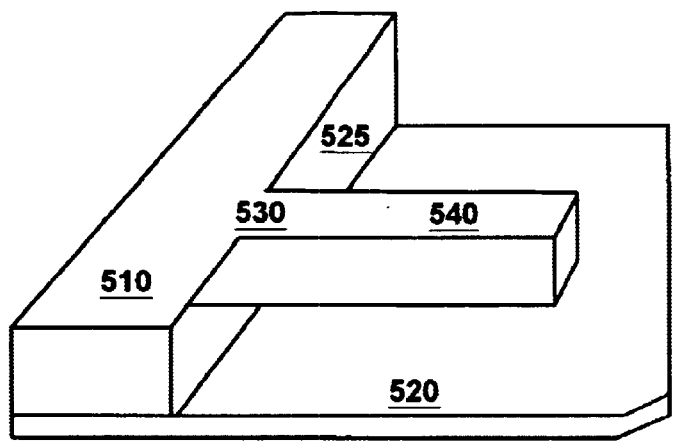
FIG. 5 is a three dimensional view showing coupling of the beam to a structural layer according to an embodiment of the present invention.

FIG. 5 is a three dimensional view 500 showing coupling of the beam to a structural layer according to the present invention. The structural layer 510 deposited over the substrate 520 is provided with a surface 525 perpendicular to and extending above the substrate. One end of the beam 540 is coupled to this surface at an anchor point 530. In this embodiment, displacement of the beam is due to bending of the beam itself. As a result, the displaced end of the beam will follow a non-circular path. Further, electrical connection to electrodes placed on the head of the beam is simplified. This in turn allows for more precise displacement and control.

Figure 6:
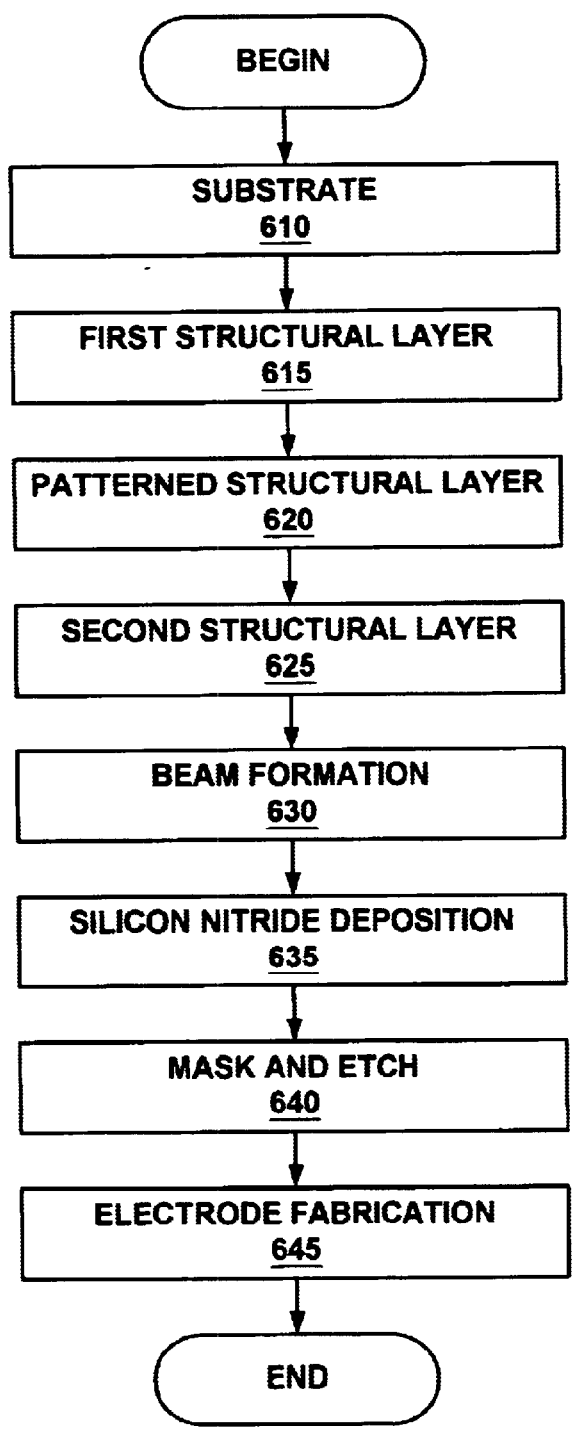
FIG. 6 is a flow chart showing the process steps used in fabrication of the pendulum motor according to an embodiment of the present invention.

FIG. 6 is a flow chart showing the process steps used in fabrication of the pendulum motor according to an embodiment of the present invention. In this embodiment, CMOS process is used. Step 610 involves selection of a suitable substrate on which to fabricate the pendulum motor. In one embodiment of the present invention, a silicon wafer is chosen as the substrate and is prepared for deposition of a first structural layer.

In step 615, a first structural layer is deposited on the surface of the substrate. In one embodiment of the present invention, this first structural layer is silicon dioxide.

A patterned sacrificial layer is deposited in step 620. In one embodiment of the present invention, the sacrificial layer is composed of polysilicon which is deposited on the surface of the first structural layer. The pattern is used to form the outline of the stator and the moveable member.

In step 625, a second structural layer is deposited over the patterned sacrificial layer. During deposition, this second structural layer is coupled directly to the first structural layer in areas defined by the pattern of the sacrificial layer. In one embodiment of the present invention, this second structural layer is silicon dioxide.

In step 630, polysilicon is deposited in accordance with the established pattern to complete formation of the moveable member as well as portions of the stator.

A layer of silicon nitride is deposited over the entire area in step 635 in preparation for masking and etching steps to follow.

Step 640 begins with a masking operation that outlines the regions of sacrificial layers to be etched. Etching of the sacrificial layers is then used to free portions of the moveable member from the underlaying first structural layer and to define and to remove sacrificial layers from the region in which the movable member is to be displaced. The use of xenon di-flouride for etching the sacrificial layers is a unique step in the process. Xenon di-flouride will not significantly etch the silicon nitride layer deposited in the prior step, but will etch the exposed sacrificial layers that are composed of polysilicon.

The final step 645 in the process involves formation of electrode elements on the stator and the moveable member. In one embodiment of the present invention, the electrode elements are formed by deposition of aluminum on the surface of the silicon nitride layer in positions over the stator and the moveable member. The electrodes may be arranged to produce the optimum electrostatic field across a gap separating the moveable member and the stator which may include a comb type arrangement of the electrodes. Additionally, electrodes may be positioned on surfaces of the stator and the moveable member which are at angles relative to the plane of displacement of the moveable member.

Figure 7:
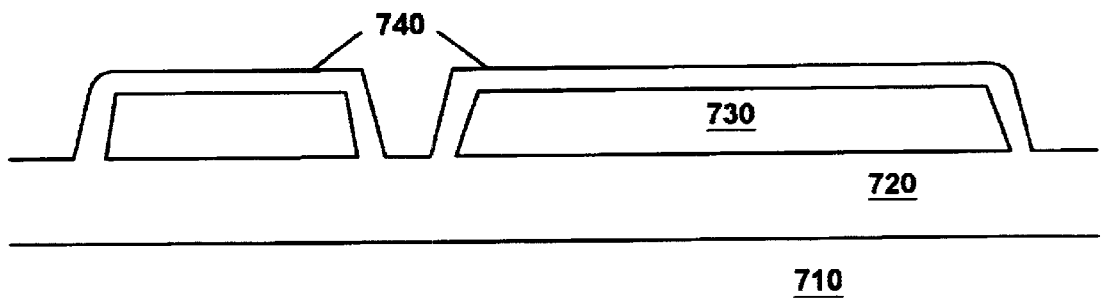
FIG. 7 is a cross-sectional view showing results after the first four process steps used in fabrication of the pendulum motor according to the present invention.

FIG. 7 is a cross-sectional view showing results after the first four process steps used in fabrication of the pendulum motor according to one embodiment of the present invention. The substrate 710 is a silicon wafer upon the surface of which is deposited the first structural layer 720 composed of silicon dioxide. A first sacrificial layer 730 composed of polysilicon is deposited in a pattern on the surface of the first structural layer. This sacrificial layer is then covered with a second structural layer 740 composed of silicon dioxide which is coupled to the first structural layer in accordance with the desired pattern.

Figure 8:
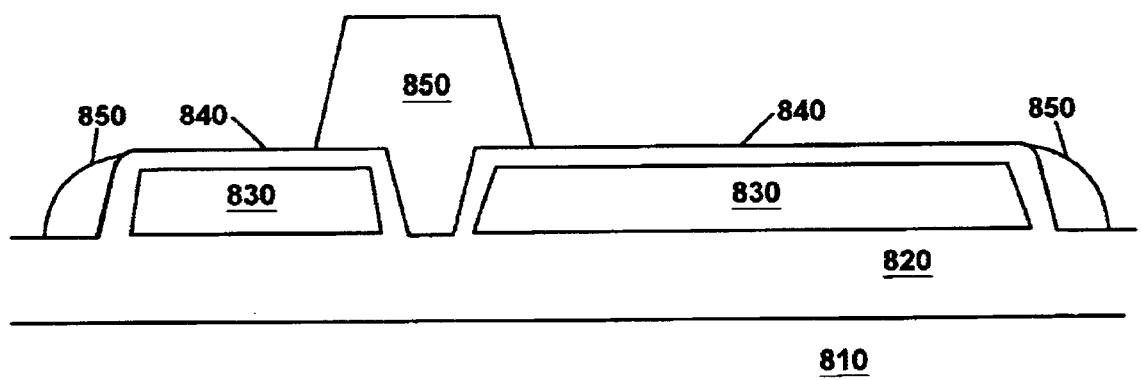
FIG. 8 is a cross-sectional view showing results after the fifth process step used in fabrication of the pendulum motor according to an embodiment of the present invention.

FIG. 8 is a cross-sectional view showing results after the fifth process step used in fabrication of the pendulum motor according to one embodiment of the present invention. The substrate 810 is a silicon wafer upon the surface of which is deposited the first structural layer 820 composed of silicon dioxide. A first sacrificial layer 830 composed of polysilicon is deposited in a pattern on the surface of the first structural layer. This sacrificial layer is then covered with a second structural layer 840 composed of silicon dioxide which is coupled to the first structural layer in accordance with the desired pattern. A second layer of polysilicon 850, portions of which are sacrificial, is then deposited in a pattern to form the moveable member and the stator.

Figure 9:
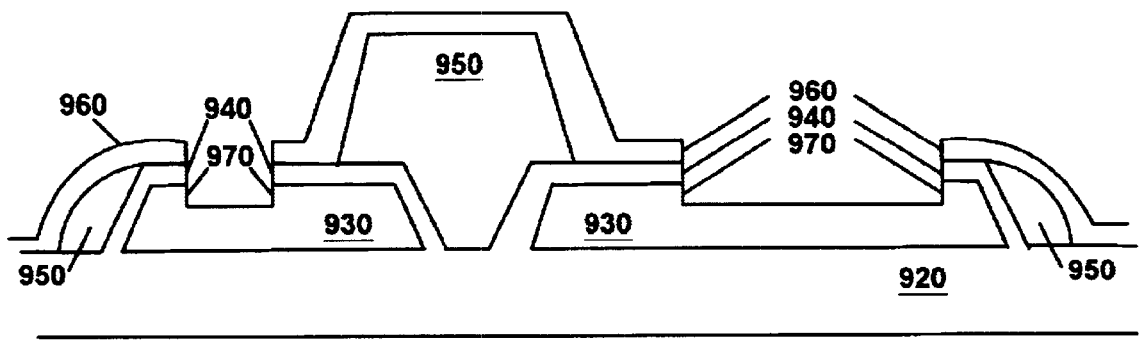
FIG. 9 is a cross-sectional view showing results after the deposition of silicon nitride, masking and opening windows in preparation for etching sacrificial layers in the process used to fabricate the pendulum motor according to an embodiment of the present invention.

FIG. 9 is a cross-sectional view showing results after the deposition of silicon nitride, masking and opening windows in preparation for etching sacrificial layers in the process used to fabricate the pendulum motor according to one embodiment of the present invention. The substrate 910 is a silicon wafer upon the surface of which is deposited the first structural layer 920 composed of silicon dioxide. A first sacrificial layer 930 composed of polysilicon is deposited in a pattern on the surface of the first structural layer. This sacrificial layer is then covered with a second structural layer 940 composed of silicon dioxide which is coupled to the first structural layer in accordance with the desired pattern. A second layer of polysilicon 950, portions of which are sacrificial, is then deposited in a pattern to form the moveable member and the stator. A layer of silicon nitride 960 is deposited over the entire surface. Windows 970 are opened through the layer of silicon nitride and the silicon dioxide in preparation for selective etching for the removal of portions of the sacrificial layer 930.

Figure 10:
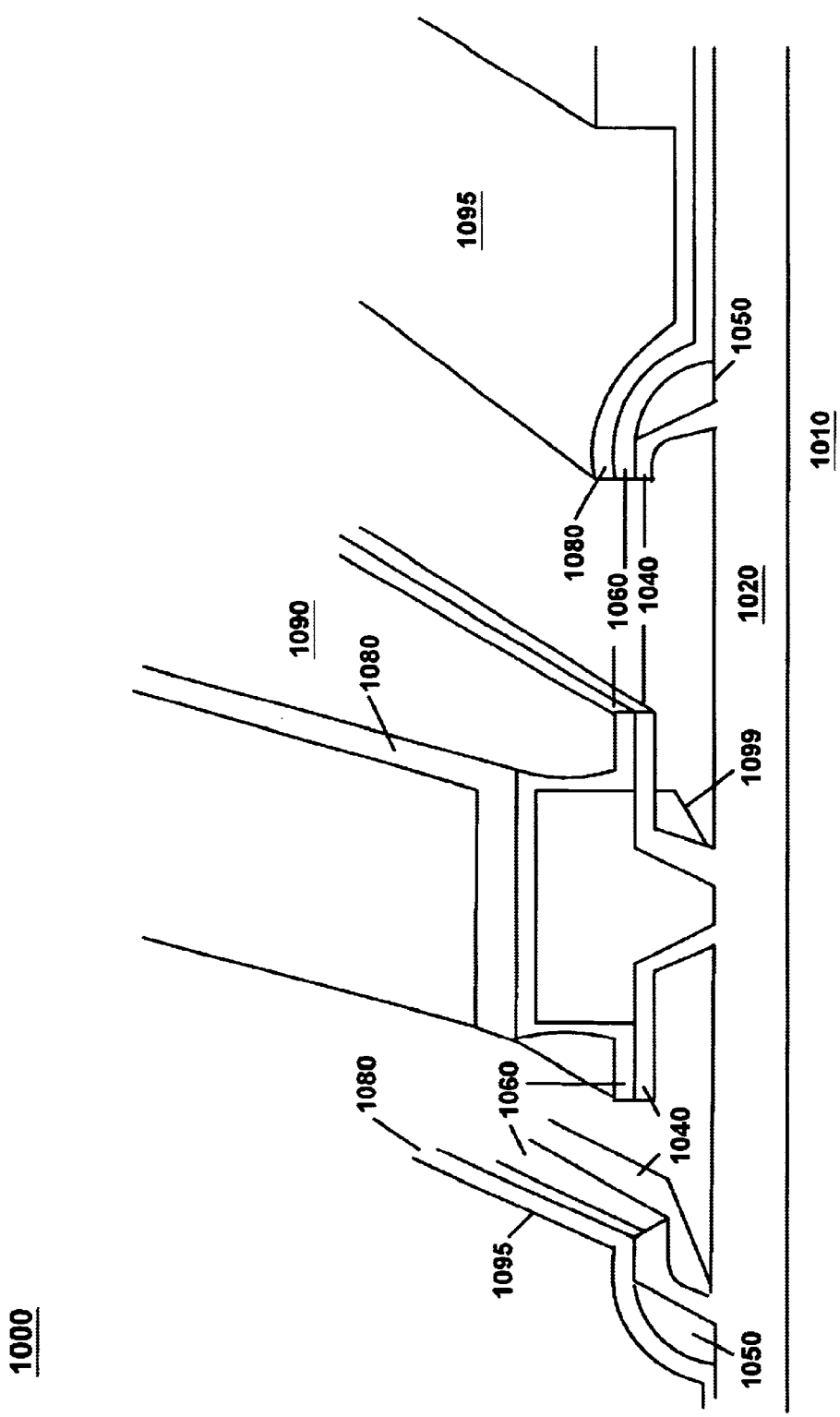
FIG. 10 is a three-dimensional view of the pendulum motor after etching the sacrificial layer showing attachment of the beam to the first structural layer by means of a post, and location of electrode elements according to an embodiment of the present invention.

FIG. 10 is a three-dimensional view of the pendulum motor after etching the sacrificial layer and showing attachment of the beam 1090 to the first structural layer 1020 by means of a post 1099, as well as positioning of electrode elements 1080 according to one embodiment of the present invention. The substrate 1010 is a silicon wafer upon the surface of which is deposited the first structural layer 1020 composed of silicon dioxide. A second structural layer 1040 composed of silicon dioxide is coupled to the first structural layer in accordance with the desired pattern. A second layer of polysilicon 1050, portions of which are sacrificial, is deposited in a pattern to form the moveable member 1090 and the stator 1095. Windows opened through the layer of silicon nitride 1060 and the silicon dioxide 1040 have been used for selective etching and removal of portions of the sacrificial layer deposited previously. Finally, electrode elements 1080 have been positioned over desired regions of the moveable member 1090 and the stator 1095.

Figure 11A:
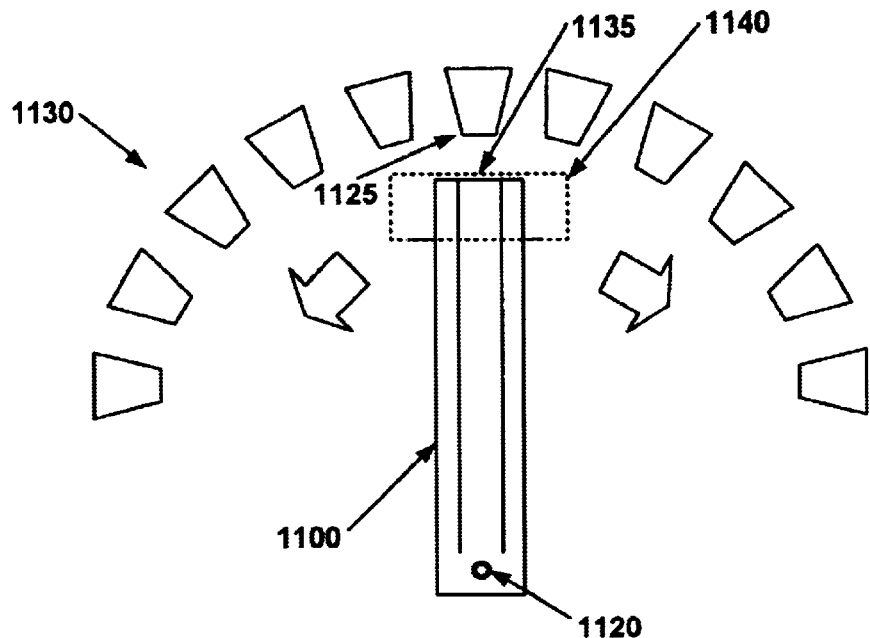
FIG. 11a is a plan view of the pendulum motor showing one application as a switching device according to an embodiment of the present invention.

FIG. 11a is a plan view of the pendulum motor showing one application as an optical switching device according to one embodiment of the present invention. The moveable member 1100 is a cantilever beam anchored at one point 1120. The moveable end of the beam is displaced along a path under the influence of an electric field generated across a gap 1125 separating stator electrodes 1130 from one or more electrodes 1135 located on the moveable end of the beam. Positioning a hammerhead shaped mirror 1140 on the moveable end of the beam provides the opportunity for optical switching applications.

Figure 11B:
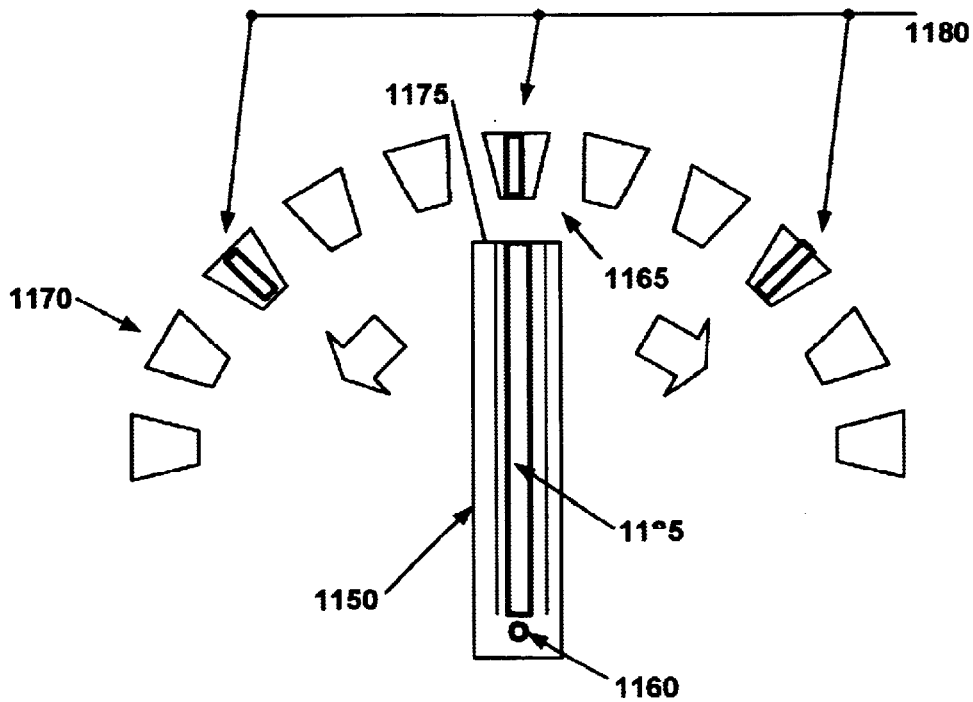
FIG. 11b is a plan view of the pendulum motor showing one application as a switching device using waveguides according to an embodiment of the present invention.

FIG. 11b is a plan view of the pendulum motor showing one application as an optical switching device according to one embodiment of the present invention. The moveable member 1150 is a cantilever beam anchored at one point 1160. The moveable end of the beam is displaced along a path under the influence of an electric field generated across a gap 1175 separating stator electrodes 1170 from one or more electrodes 1175 located on the moveable end of the beam. Positioning waveguide structures 1180 above the stator electrodes along with a waveguide structure 1185 along the length of the beam provides the opportunity for switching applications. In a second embodiment of the present invention, the interior of the beam may be used as a waveguide in place of a waveguide 1185 placed on the surface of the beam.

Figure 12:
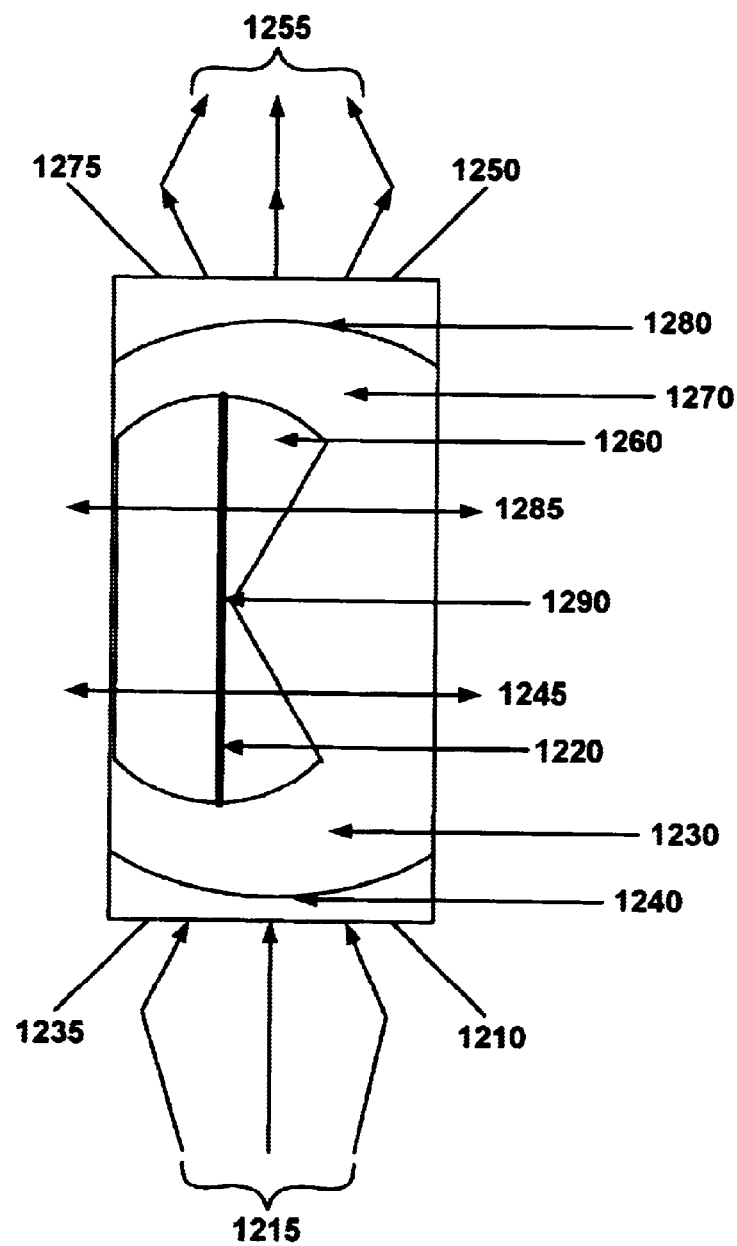
FIG. 12 is a plan view of a dual pendulum motor arrangement that provides a one-channel M×N switch according to an embodiment of the present invention.

FIG. 12 is a plan view of a dual pendulum motor arrangement that provides a one-channel M×N switch according to one embodiment of the present invention. The first pendulum motor consists of a stator 1210 and a moveable member in the form of a cantilever beam 1220. The cantilever beam is attached to the structural layer at a single position 1290. A beam electrode 1230 is located on the moveable end of the beam. An electric field across the gap 1240 separating the stator and an electrode array 1235 on the stator may be used to displace the beam along a circular path 1245 and hold it in a predetermined position.

The second pendulum motor consists of a stator 1250 and a moveable member in the form of a cantilever beam 1260. The cantilever beam is attached to the structural layer at a single position 1290. A beam electrode 1270 is located on the moveable end of the beam. An electric field across the gap 1280 separating the stator and an electrode array 1275 on the stator may be used to displace the beam along a circular path 1285 and hold it in a predetermined position.

The resulting structure is useful as a switch for light signals. By using each beam as a waveguide, it is possible to route light signals from one of M input signal sources 1215 located on stator 1210 to one of N output receptors 1255 located on stator 1250. Thus the implementation of a one channel M×N switch. In a second embodiment, light reflecting surfaces may be used in place of wave guides to form an optical switch. The resulting optical switch would exhibit low insertion loss, reduced crosstalk, and would of course be both wavelength and polarization independent.

The preferred embodiment of the present invention, substrate based pendulum motor, is thus described. While the present invention has been described in particular embodiments, it should be appreciated that the present invention should not be construed as limited by such embodiments, but rather construed according to the below claims.

What is claimed is:

1. A micro electro mechanical machine comprising:
   a structural layer on a substrate surface;
   a stator formed by etching sacrificial layers on said structural layer;
   a cantilevered member coupled to said structural layer and positioned for movement relative to said stator, said member formed and positioned with respect to said structural layer surface during said etching of said stator; and
   a device generating and sustaining an electrostatic field across a gap separating said stator and said member that generates a force sufficient to displace said member relative to said stator and wherein facing surfaces of said stator and said member across said gap are free of contact with each other.

2. A micro electro mechanical machine according to claim 1 wherein said member is a solid cantilever beam.

3. A micro electro mechanical machine according to claim 1 wherein said member is a hollow cantilever beam.

4. A micro electro mechanical machine according to claim 1 further comprising a post like structure situated between one side of said member and the surface of said structural layer and wherein said member is a beam with length greater than the greatest cross-sectional dimension that is coupled to said structural layer by said post like structure.

5. A micro electro mechanical machine according to claim 4 wherein displacement of the uncoupled end of said beam follows a circular path that is parallel to said surface of said structural layer.

6. A micro electro mechanical machine according to claim 5 wherein said uncoupled end of said beam is in the form of a segment of a disk positioned parallel to said surface of said structural layer and located such that the centerline along the length of said beam bisects said segment and passes through the center point of said disk.

7. A micro electro mechanical machine according to claim 1 further comprising a mounting structure coupled to said structure layer and wherein said member is a beam with length greater than the greatest cross-sectional dimension that has one end of said beam coupled directly to a surface of said mounting structure, said surface in a plane perpendicular to said structural layer.

8. A micro electro mechanical machine according to claim 7 wherein displacement of the uncoupled end of said beam follows a non-circular path that is parallel to said surface of said structural layer.

9. A micro electro mechanical machine according to claim 8 wherein said uncoupled end of said beam is in the form of a torus placed parallel to said surface of said structural layer and located such that the centerline along the length of said beam bisects said torus and passes through the generation point of said torus.

10. A micro electro mechanical machine comprising:
    a structural layer on a substrate surface;
    a stator formed by etching sacrificial layers on said structural layer;
    a cantilever beam formed by etching said sacrificial layers on said structural layer, positioned parallel to the surface of said structural layer with one end of said beam coupled to said structural layer at one couple position, wherein the uncoupled end of said beam is displaceable about said couple position relative to said structural layer; and
    a series of electrode elements arranged on said stator and at least one beam electrode element positioned on said cantilever beam used to form an electrostatic field across a gap between said beam and said stator that generates a force sufficient to displace and hold said uncoupled end of said cantilever beam in a predetermined position relative to said stator.

11. A micro electro mechanical machine according to claim 10 wherein said series of electrode elements are arranged in a plane on the surface of said stator and said beam electrode element is positioned on the surface of said beam.

12. A micro electro mechanical machine according to claim 10 wherein said series of electrode elements and said beam electrode element are positioned to form a comb type electrode arrangement.

13. A micro electro mechanical machine according to claim 10 wherein said series of electrode elements and said beam electrode element are arranged on surfaces positioned at angles relative to said surface of said structural layer.

14. A micro electrical mechanical machine according to claim 10 wherein said beam is coupled to said structural layer by means of a post like structure between one side of said beam and said surface of said structural layer.

15. A micro electro mechanical machine according to claim 10 wherein one end of said beam is coupled directly to a second surface of said structural layer, said second surface extending above said structural layer in a plane perpendicular to said structural layer.

16. A micro electro mechanical machine according to claim 10 wherein said uncoupled end of said beam is in the form of a segment of a disk positioned parallel to said surface of said structural layer and located such that the centerline along the length of said beam bisects said segment and passes through the center point of said disk.

17. A micro electro mechanical machine according to claim 10 wherein said uncoupled end of said beam is in the form of a torus positioned parallel to said surface of said structural layer and located such that the centerline along the length of said beam bisects said torus and passes through the generation point of said torus.

18. A method of fabricating a micro electro mechanical machine comprising the steps of:
    providing a substrate in a plane;
    providing on said substrate a first structural layer;
    providing on said first structural layer a second structural layer coupled to said first structural layer and patterned over a first sacrificial layer to form a first member and a second member such that said sacrificial layer separates portions of said first member and said second member;
    providing, on said second structural layer, a silicon nitride layer over a second sacrificial layer patterned over said first member;
    etching said sacrificial layers to free portions of said first member such that said portions are moveable with respect to said second member; and
    providing electrical means for selectively generating and sustaining an operational strength electrostatic field across a gap between said first and said second members in the common plane.

19. A method according to claim 18 wherein the step of providing electrical means includes the step of depositing electrodes over said first and second members to form an electrostatic field across a gap between said members that generates a force sufficient to displace and hold said free portions of said first member in a predetermined position relative to said second member.

20. A method according to claim 18 wherein said step of etching of said sacrificial layers is accomplished with xenon di-flouride.

21. A method according to claim 18 wherein all said steps are compatible with current CMOS processes.

* * * * *